United States Patent [19]

Temme

[11] 4,364,470
[45] Dec. 21, 1982

[54] SCRAPER-CHAIN CONVEYOR

[75] Inventor: Helmut Temme, Waltrop, Fed. Rep. of Germany

[73] Assignee: Gewerkschaft Eisenhutte Westfalia, Fed. Rep. of Germany

[21] Appl. No.: 155,996

[22] Filed: May 23, 1980

[30] Foreign Application Priority Data

May 26, 1979 [DE] Fed. Rep. of Germany ....... 2921460

[51] Int. Cl.³ ............................................ B65G 19/28
[52] U.S. Cl. ..................................................... 198/735
[58] Field of Search .............. 198/719, 732, 735, 734, 198/383, 384; 299/34, 43

[56] References Cited

U.S. PATENT DOCUMENTS 3,583,552  6/1971  Renwick ............................. 198/735

FOREIGN PATENT DOCUMENTS 982591  2/1965  United Kingdom .................. 299/34
1132567  11/1968  United Kingdom ................ 198/735

Primary Examiner—John J. Love
Assistant Examiner—Douglas D. Watts
Attorney, Agent, or Firm—Neil F. Markva

[57] ABSTRACT

A scraper-chain conveyor, for use in inclined mine workings, comprises a plurality of channel sections joined together end-to-end, and a scraper assembly. Each channel section has a pair of side walls interconnected by a floor plate. The scraper assembly comprises a plurality of scrapers connected to a drive chain. The side walls of the channel sections are shaped to define, together with the floor plates, three vertically-spaced, generally trapezoidal ducts. The uppermost and lowermost ducts provide guidance for the scrapers when the scrapers are respectively in their upper and lower runs. The middle ducts accommodate coupling members, such as toggle bolts, for connecting the channel sections together.

12 Claims, 3 Drawing Figures

SCRAPER-CHAIN CONVEYOR

BACKGROUND TO THE INVENTION

This invention relates to a scraper-chain conveyor, and in particular to a scraper-chain conveyor for use in inclined mine workings.

A scraper-chain conveyor is constituted by a plurality of channel sections joined together end-to-end. Each channel section has a pair of side walls which are joined together by means of a welded-in floor plate. The floor plates define a continuous conveying surface, which is usually positioned mid-way up the side walls. Consequently, the floor plates divide the conveyor into two regions, and the scraper assembly of the conveyor circulates in these regions. In the upper region (or run) the scrapers of the scraper assembly convey away won mineral material (such as coal), the lower region constituting a return run for the scrapers. The side walls of the channel sections are sigma-shaped, so that the two runs are defined by ducts of generally trapezoidal cross-section. These ducts serve to guide the scrapers which have a similar cross-section.

When such a scraper-chain conveyor is used in even fairly steeply inclined mine workings, there is the danger that pieces of material, such as lumps of coal, will slide down the upper flanges of the sigma-shaped side walls of the conveyor, without being slowed down by the scrapers. Obviously, this is undesirable, as it puts faceworkers and expensive mining equipment in danger of being hit by rapidly-moving pieces of mineral material. In very steeply inclined mine workings, there is the additional danger of pieces of mined material jumping out of the upper run of the conveyor.

In order to counteract the tendency of mined material to slide down the conveyor flanges or to jump out of the upper run, it is known to provide the conveyor with scrapers of very considerable height (see DE-GM 1872 409 and DE-GM 1870 416). In this case, the conveyor has to be jacked up, so it acquires a considerable total height. Obviously, this is disadvantageous as the conveyor occupies an excessive amount of the restricted space available in such mine workings.

The aim of the invention is to provide a scraper-chain conveyor for use in inclined mine workings, which conveyor does not suffer from these disadvantages, and which does not occupy too much space in a restricted mine working.

SUMMARY OF THE INVENTION

In its broadest aspect, the present invention provides a scraper-chain conveyor channel section comprising a pair of side walls interconnected by a floor plate, the side walls being so shaped that, together with the floor plate, they define three vertically-spaced, generally trapezoidal ducts, the uppermost and lowermost ducts providing guidance for the scrapers of a scraper assembly, and the middle duct accommodating a coupling member for attaching the channel section to an adjacent channel section.

The invention also provides a scraper-chain conveyor comprising a plurality of channel sections joined together end-to-end, and a scraper assembly, each channel section having a pair of side walls interconnected by a floor plate, and the scraper assembly comprising a plurality of scrapers connected to drive chain means, wherein the side walls of the channel sections are shaped to define, together with the floor plates, three vertically-spaced, generally trapezoidal ducts, the uppermost and lowermost ducts providing guidance for the scrapers when the scrapers are respectively in their upper and lower runs, and the middle ducts accommodating coupling members for connecting the channel sections together.

Advantageously, all three ducts have substantially the same height and cross-section.

Because the middle ducts accommodate the coupling members, and the middle ducts have a height substantially equal to that of the uppermost and lowermost ducts, large coupling members can be used. Consequently, the channel sections of this type of conveyor can be connected together in a reliable manner by coupling members of increased strength.

Preferably, each side wall of each channel section comprises a lower portion, and an upper portion which is welded to the lower portion, and each of said lower portions has a sigma-shaped cross-section. The lower portions can, therefore, be standard sigma-shaped sections. Moreover, the upper portions can be made from standard sigma-shaped sections by parting such sections just above and just below their central points. Advantageously, the floor plate of each channel section is welded to the middle portions of the sigma-shaped lower portions of the side walls.

Advantageously, each side wall of each channel section is provided with a strengthening plate, each strengthening plate being attached to both the upper and lower portions of its associated side wall. This results in a particular strong and stable construction.

Conveniently, the lower edges of a pair of cover strips are welded to the floor plate of each channel section, the upper edges of said cover strips being welded to the upper edges of the lower portions of the adjacent side walls, and wherein the cover strips are inclined. The cover strips help to promote the flow of fine material out of the two upper ducts, and also help to strengthen the channel sections.

Preferably, the strengthening plates are provided with three vertically-spaced rows of holes for receiving fastening bolts for connecting attachments to the conveyor. This enables the attachments such as spill plates and a plough guide to be attached rigidly to the side walls of the conveyor. Advantageously, each of said holes has an enlarged portion of receiving the head of an associated bolt.

Preferably, each coupling member is a toggle bolt having a shank provided at each end with an enlarged head, each toggle bolt mating with appropriately-shaped recesses formed in a pair of inserts attached to the adjacent ends of the middle ducts of the corresponding side walls of a pair of adjacent channel sections. Advantageously, the recesses in said inserts open out towards the uppermost ducts, whereby the toggle bolts can be inserted into mating engagement with their respective recesses from the upper run of the conveyor. Alternatively, the coupling members could be threaded members such as cap screws.

Advantageously, at least some of the scrapers are provided with flaps, each flap extending the length of its associated scraper and being pivotably attached thereto about a pivot joint whose axis lies parallel to the longitudinal axis of said scraper, whereby the flaps can be pivoted downwards so as to extend into the middle ducts when the scrapers are in the upper run, and the flaps can be pivoted upwards into the spaces between adjacent scrapers when the scrapers are in the lower run. In steeply inclined mine workings, these flaps prevent fine material sliding down the conveying surface constituted by the floor plates of the channel sections. Usually only every fifth or eighth scraper needs to be provided with such a flap.

BRIEF DESCRIPTION OF THE DRAWINGS

Two forms of scraper-chain conveyor, each constructed in accordance with the invention, will now be described, by way of example, with reference to the accompanying drawings, in which.

DESCRIPTION OF PREFERRED EMBODIMENTS

Figure 1:
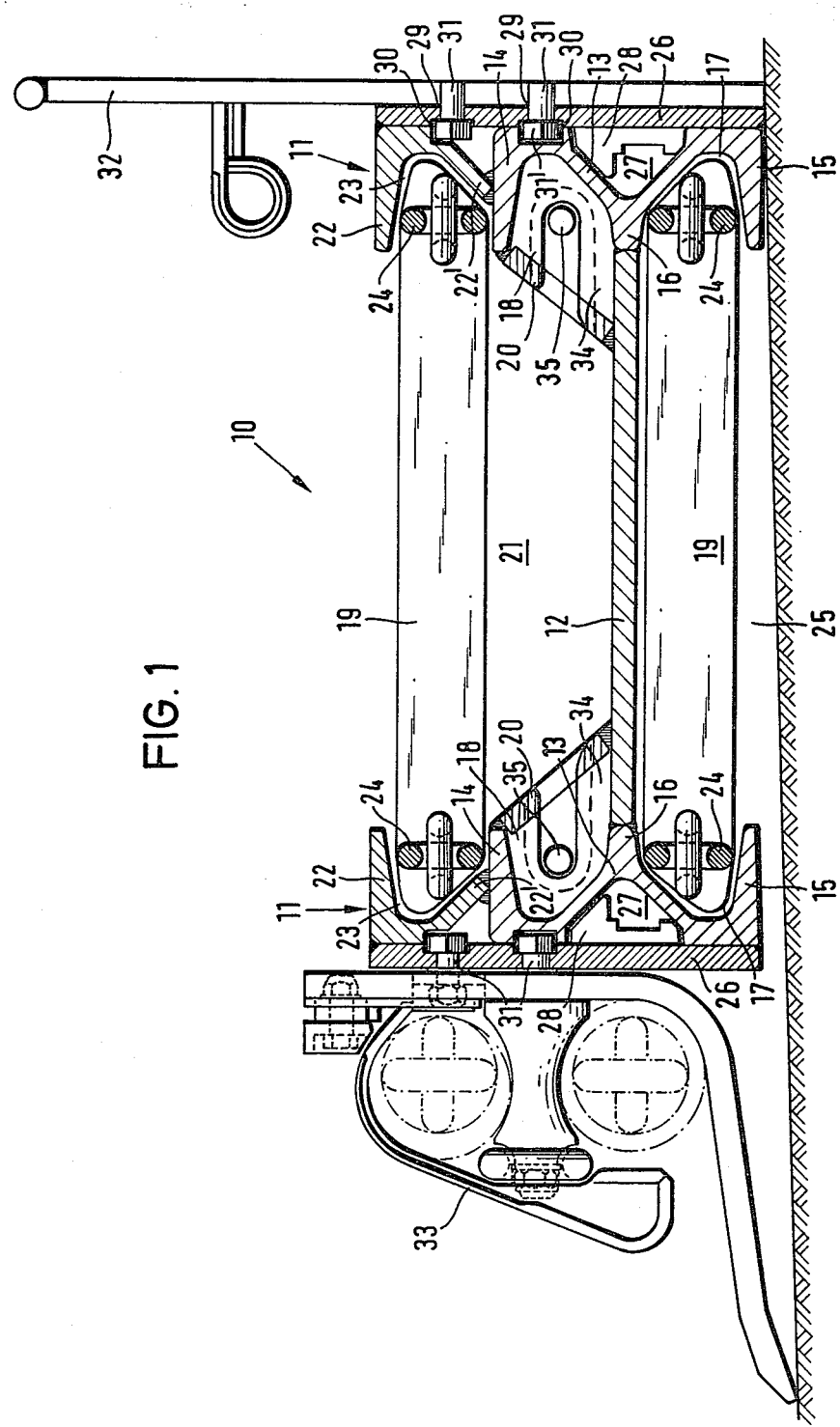
FIG. 1 is a part-sectional end elevation of the first form of conveyor.

Referring to the drawings, FIG. 1 shows one channel section 10 of a scraper-chain conveyor, the conveyor having a plurality of identical channel sections positioned end-to-end. The channel section 10 has a pair of side walls 11, which are symmetrically disposed about the central, longitudinal plane of the channel section. The side walls 11 are interconnected by a welded-in floor plate 12. Each side wall 11 is of two-part construction, namely a lower portion 13, and an upper portion 22 which is welded to the lower portion. Each lower portion 13 is a standard sigma-shaped, scraper-chain conveyor channel section side wall, and has a top flange 14, a base flange 15 and a middle flange 16. The middle flanges 16 of the two lower portions 13 are interconnected by the welded-in floor plate 12, and the upper portions 22 are welded onto the top flanges 14. The flanges 14, 15 and 16 and the floor plate 12 define two vertically-spaced ducts 17 and 18, each of trapezoidal cross-section. The lower duct 17 forms part of the lower, return run 25 for the scrapers 19 of the scraper assembly. The upper duct 18, however, lies below the upper, working run of the scraper assembly. Inclined, welded-in strips 20 are provided between the ends of the top flanges 14 and the floor plates 12, the strips 20 separating a central portion 21 of the duct 18 from its two outer portions. The outer portions of the duct 18 form regions for accommodating coupling members 35 which are used (as described below) to connect the channel section 10 to the adjacent channel sections.

The upper side wall portions 22 are angled metal members each of whose shape corresponds to that of the upper part of the corresponding lower side wall portion 13. Consequently, the two upper portions 22 define a trapezoidal duct 23 which forms part of the upper, working run of the scrapers 19 of the scraper assembly. The trapezoidal shape of the ducts 17 and 23 corresponds to the shape of the scrapers 19, so that these ducts act as guides for the scraper assembly. All three ducts 17, 18 and 23 have substantially the same shape and size. The upper portions 22 can be made from a standard sigma-shaped, scraper-chain conveyor channel section side wall (such as the lower portion 13) by parting such a side wall just above, and just below, the middle flange 16.

The scrapers 19 are elongate and of box-section. Their ends are connected to two outboard chains 24. The chains 24 have round links, and form, together with the scrapers 19, a scraper assembly having a double chain. The height of the scrapers 19 corresponds to the height of the return run 25. In the upper run, the scrapers 19 move along on the top flanges 14 of the lower portions 13, and hence are spaced from the floor plates 12. The distance between the lower edges of the scrapers 19 and the floor plates 12 corresponds roughly to the distance between the top flanges 14 and the middle flanges 16. This distance is greater than the height of the scrapers 19.

The side walls 11 of the channel section 10 are strengthened by plates 26, which are welded to both the lower portions 13 and the upper portions 22. The welded-in strips 20 also increase the strength and stiffness of the channel section 10. Each of the lower portions 13 has a V-shaped recess 27 extending along its outer surface at the middle thereof, the V-shaped recesses defining the characteristic sigma-shape of these members. Spill-plate holders 28 are spaced over the entire length of the conveyor, and are provided with apertures (not shown) which are open at the ends of the holders. These open apertures permit bolts (not shown) to be introduced into the apertures, with the bolt heads lying within the V-shaped recesses 27, and the bolt shanks projecting laterally beyond the side walls. Attachments, such as spill plates, can then be attached firmly to the side walls 11 by means of these bolts.

Thus, at the level of the floor plates 12, the side walls 11 of the conveyor each have a row of holes for receiving attachment bolts for the spill plates or other attachments. A second row of bolt holes 29 is provided in each side wall 11 above this first row of holes. The bolt holes 29 are provided in the plates 26, and each bolt hole is provided with recesses 30 in the associated plate 26 and lower portion 13 for accomodating the head 31' of a bolt 31. A third row of bolt holes 29 is provided in each side wall 11 above the second row of holes. Here again, each bolt 29 has recesses 30 for accommodating the head 31' of a bolt 31. These recesses 30 are, in this case, formed in the associated plates 26 and upper portions 22.

In the embodiment shown in FIG. 1, spill plates 32 are attached to the goaf side of the conveyor by means of the bolts 31 associated with the two upper rows of holes 29. On the opposite (face) side of the conveyor, a plough guide 33 is attached by means of the bolts 31 associated with the two upper rows of holes 29.

Generally trapezoidal inserts 34 are welded into the outer portions of the middle duct 18 at the ends thereof, each insert having an axial bore for receiving a bolt 35. In order to connect the channel section 10 to its neighbouring channel sections, the bolts 35 are inserted into the aligned axial bores of the adjacent inserts 34 of the adjacent channel sections. The bolts 35 are then tightened up to connect the channel sections. The bolts 35 can be cap screws, and can be inserted from the upper run of the conveyor.

Figure 2:
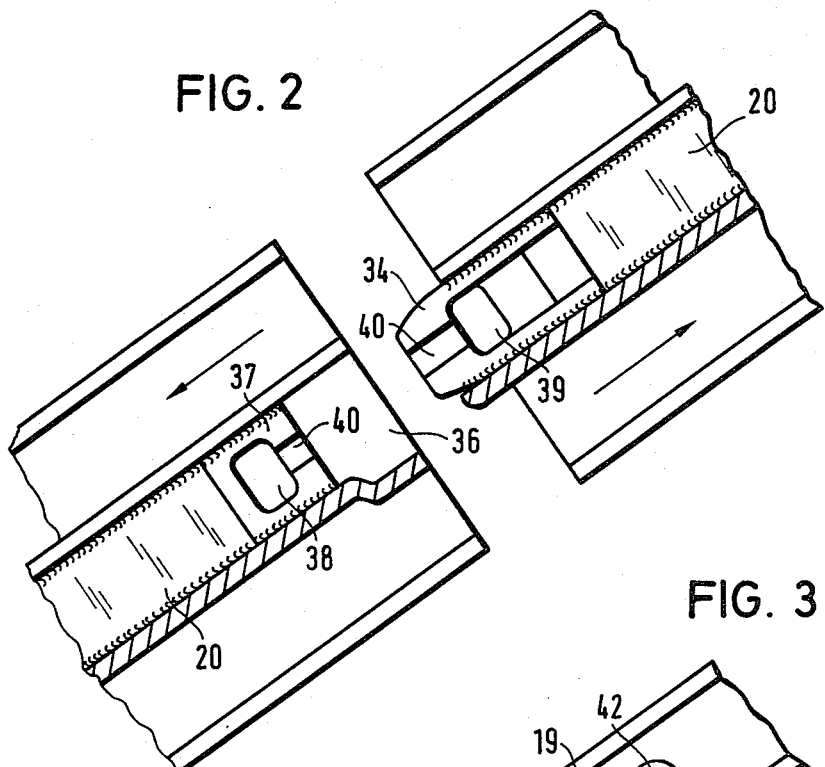
FIG. 2 is a side elevation showing the adjoining ends of a pair of channel sections of the conveyor of FIG. 1.

Alternatively, as shown in FIG. 2, each channel section may have two sorts of insert. Thus, each channel section has two inserts 34 at one end, two inserts 37 at the other end, the inserts 34 of a given channel section cooperating with the inserts 37 of the adjacent channel section. In this case, the inserts 36 extend axially beyond the end face of their channel section, and the inserts 37 are set back from the end face of their channel sections by a sufficient distance to accommodate the axially-projecting portions of the inserts 34. The ends 36 of the outer portions of the ducts 18 adjacent to the inserts 37 are widened slightly, so that they can receive the axially-projecting portions of the inserts 34 in such a manner as to permit limited play in all directions. Each pair of adjacent inserts 34, 37 is provided with a connection member (not shown) in the form of a toggle bolt (a so-called dog-bone connector). This type of connection member has a shank provided with an enlarged head at each end thereof. The shank of each connection member is sized to mate with apertures 40 in the associated inserts 34 and 37, and the heads of the connection member are sized to engage within apertures 38 and 39 formed respectively in the inserts 37 and 34. The apertures 38, 39 and 40 are open towards the interior of the channel sections, and the strips 20 extend only as far as the inserts 34 and 37, so that the connection members can be inserted into the apertures from the upper run of the conveyor. Thus, as is possible with the connectors 35 shown in FIG. 1, it is possible, with this type of connection member, to attach members such as the spill plates 32 and the plough guide 33 before the channel sections are joined together to form the finished conveyor.

Figure 3:
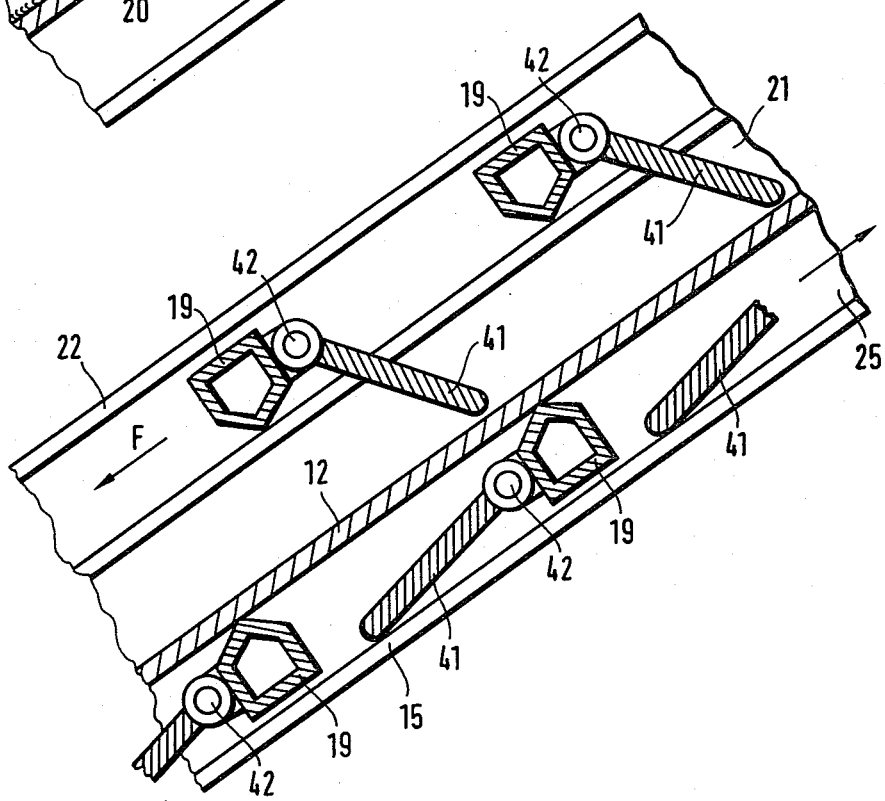
FIG. 3 is a part-sectional side elevation of part of one channel section of the second form of conveyor.

FIG. 3 shows part of a modified form of conveyor. The modification of FIG. 3 is to provide the scrapers 19 with flaps 41. Each flap 41 is pivotably connected, by a pivot joint 42, to its box section scraper 19. The axis of each pivot joint 42 is parallel to the longitudinal axis of its scraper 19. Where the conveyor is used in a steeply inclined longwall working, the flaps 41 are pivoted downwardly when their scrapers 19 are in the upper conveying run. The flaps 41 thus engage (or are spaced a short distance from) the floor plates 12 of the conveyor. Consequently, the flaps 41 prevent fine material, such as coal dust, from flowing down along the floor plates 12 (in the direction of the arrow F) beneath the scrapers 19. At the delivery end of the conveyor, the scrapers 19 pass over a chain drum (not shown) and into the lower run 25. As this happens; the flaps 41 are pivoted upwardly to lie in the spaces between the scrapers. Again, on passing from the lower run 25 to the upper run, the flaps 41 are pivoted downwardly. Although FIG. 3 shows all the scrapers 19 having flaps 41, it is usually only necessary for some of the scrapers to have flaps.

I claim:

1. A scraper-chain conveyor comprising:
   (a) plurality of channel sections directly joined together end-to-end,
   (b) each channel section having a pair of side walls interconnected by a floor plate,
   (c) a scraper assembly comprising a plurality of scrapers connected to a drive chain,
   (d) the side walls of the channel sections being shaped to define, together with the floor plates, three vertically-spaced ducts,
   (e) the scrapers being guided in the uppermost and lowermost ducts,
   (f) coupling means operatively associated with the middle ducts for connecting the channel sections together,
   (g) said coupling means includes a toggle bolt having a shank provided at each end with an enlarged head,
   (h) each toggle bolt mating with complementary recesses formed in a pair of inserts located at the adjacent ends of the middle ducts of the corresponding side walls of a pair of adjacent channel sections,
   (i) the inserts of each pair including complementary projecting and recessed portions which mate with one another so that free play is provided between the channel sections when they are directly coupled together.

2. A scraper-chain conveyor described in claim 1 wherein
   the recesses in said inserts open out towards the uppermost ducts, whereby the toggle bolts can be inserted into mating engagement with their respective recesses from the upper run of the conveyor.

3. A scraper chain conveyor described in claim 1 wherein
   at least some of the scrapers are provided with flaps, each flap extending the length of its associated scraper and being pivotably attached thereto about a pivot joint whose axis lies parallel to the longitudinal axis of said scraper, whereby the flaps can be pivoted downwards so as to extend into the middle ducts when the scrapers are in the upper run, and the flaps can be pivoted upwards into the spaces between adjacent scrapers when the scrapers are in the lower run.

4. A scraper-chain conveyor described in claim 1,
   said ducts have a trapezoidal cross-section and have substantially the same height, and
   the coupling means located at the middle duct have a size comparable to the scrapers whereby the coupling means is effective to withstand heavy loads.

5. A scraper chain conveyor described in claim 1, wherein
   all three ducts have substantially the same cross-section.

6. A scraper-chain conveyor described in claim 1, wherein
   each side wall of each channel section includes a lower portion and an upper portion which is rigidly connected to the lower portion.

7. A scraper-chain conveyor channel section comprising:
   (a) a pair of spaced, continuously formed, side walls interconnected by a floor plate and defining three vertically spaced ducts opening inwardly along the inside of the side walls and including an uppermost duct, a middle duct and a lowermost duct,
   (b) the uppermost and the lowermost ducts being effective to provide guidance for a scraper-chain conveyor, and
   (c) coupling means located in the inside of the side walls and at each end of the middle duct to directly connect each channel section to an adjacent section,
   (d) said coupling means including recesses formed at each end of the middle ducts to connectingly engage a toggle bolt having a shank with an enlarged head at each end thereof to provide a freeplay between the channel sections in all directions.

8. A scraper-chain conveyor channel section described in claim 7 wherein,
   each side wall of each channel section includes a lower portion and an upper portion which is rigidly connected to the lower portion, and
   each of said lower portions has a sigma-shaped cross-section.

9. A scraper-chain conveyor described in claim 8, wherein each side wall of each channel section includes a strengthing plate which is attached to both the upper and lower portions of its associated wall.

10. A scraper-chain as described in claim 9, wherein said strengthening plates includes a plurality of holes having enlarged portions for receiving the head of an associated fastening bolt.

11. A scraper-chain conveyor comprising:
(a) a plurality of channel sections directly joined together end-to-end,
(b) each channel section having a pair of side walls interconnected by a floor plate,
(c) a scraper assembly comprising a plurality of scrapers to a drive chain,
(d) the side walls of the channel sections being shaped to define, together with the floor plates, three vertically-spaced ducts,
(e) the scrapers being guided in the uppermost and lowermost ducts,
(f) coupling means operatively associated with the middle ducts for connecting the channel sections together,
(g) the floor plate of each channel section separates the middle duct from the lowermost duct to form an open communication between the uppermost duct and the middle duct,
(h) the lower edges of a pair of cover strips are rigidly connected to the floor plate of each channel section,
(i) the upper edges of said cover strips being rigidly connected to the upper edges of the lower portions of the adjacent side walls.

12. A scraper-chain conveyor described in claim 11, wherein
said cover plates are welded to the respective floor plates and the respective side walls.

* * * * *